April 11, 1961 C. V. JONES 2,979,365
SAFETY VALVE FOR BRAKING SYSTEM
Filed June 10, 1958 2 Sheets-Sheet 1

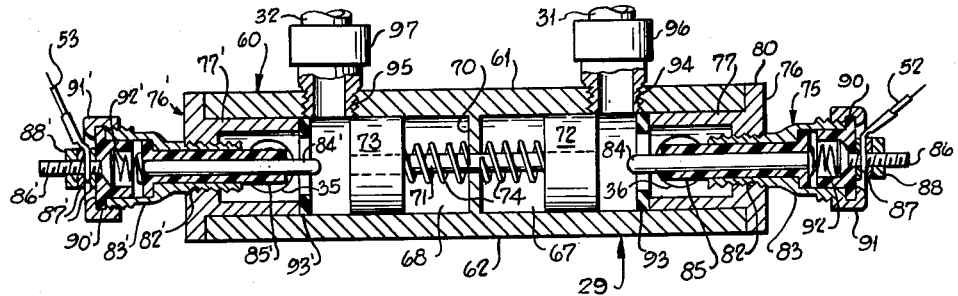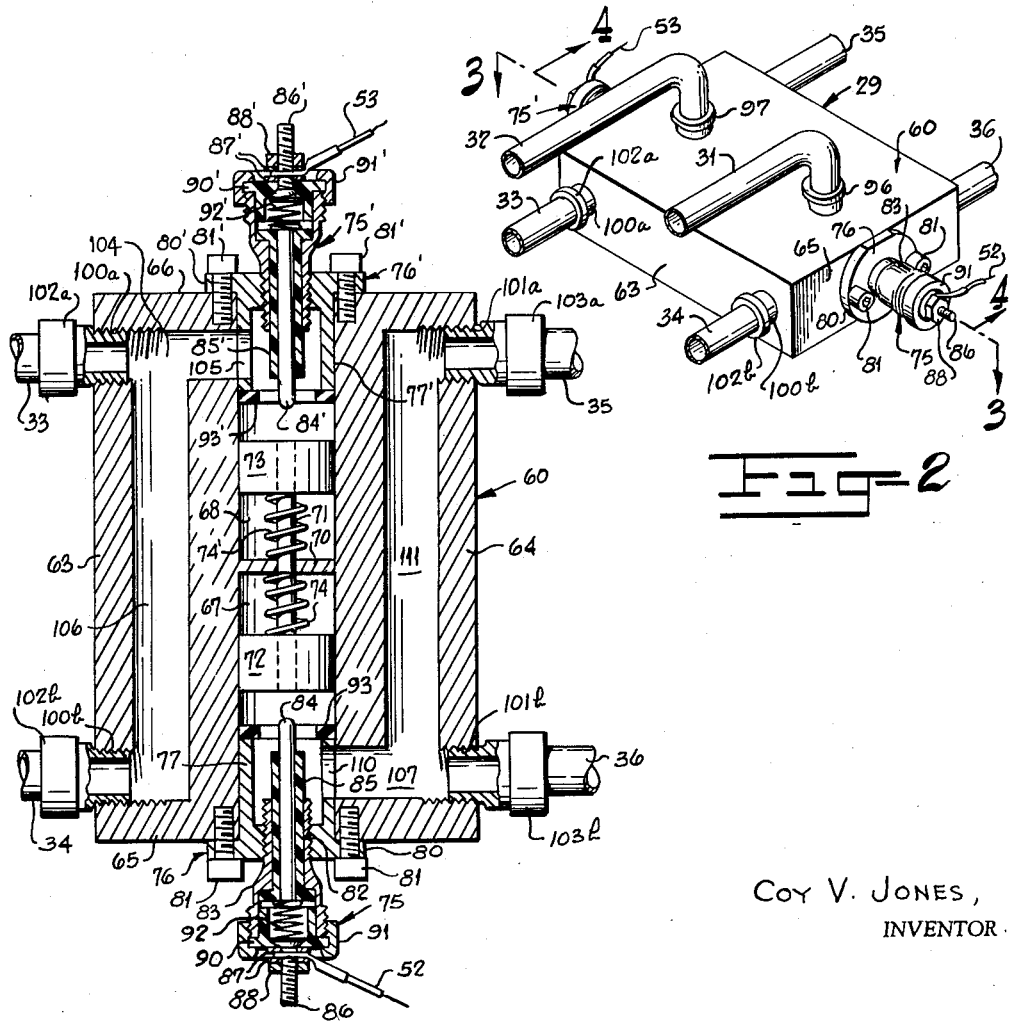

2,979,365
Patented Apr. 11, 1961

United States Patent Office

1

2,979,365

SAFETY VALVE FOR BRAKING SYSTEM

Coy V. Jones, Charlotte, N.C., assignor to Trailer Safety Valve, Inc., a corporation of North Carolina Filed June 10, 1958, Ser. No. 741,150

2 Claims. (Cl. 303—84)

The present invention relates generally to a fluid system for controlling or operating fluid actuated devices, such as an air brake mechanism, and more especially to an improved safety valve that is used therein to prevent the loss of fluid pressure from the entire system in the event of a mechanical failure in a portion of the system which would otherwise result in incapacitating the system. The improved safety valve is adapted to shut off from the system a part thereof which is no longer effective to operate as desired because of a loss of fluid or operating pressure from that part. The remaining portion of the system is thus permitted to carry on its intended function in a normal manner.

More particularly, the present invention is useful as a braking system for a powered vehicle, such as a truck, tractor or bus. In this connection, a compressed air system is commonly used to operate the brakes on a larger powered vehicle because the use of a mechanical linkage operated by the driver to obtain sufficient operating force for the brakes is impractical on the larger powered vehicles, especially where the vehicle is pulling a trailer equipped with brakes on its own wheels. Where the powered vehicle is provided with a trailer, the present braking system affords a high measure of safety against loss of braking effectiveness from the powered vehicle and trailer which could result in a serious accident.

With powered vehicles of the type described, the air brake system normally includes a compressor which provides air pressure for a primary storage tank located in the portion of the system furnishing operating pressure for the brakes of the powered vehicle and an auxiliary storage tank for use in providing operating pressure to the trailer brakes. The primary storage tank is connected to a foot-operated valve which controls the flow of air pressure to the brakes for the wheels of the powered vehicle as well as those for the trailer wheels. Should a rupture occur in an individual brake cylinder for a wheel of the powered vehicle or in a pressure line leading thereto, the operating pressure in the portion of the system furnishing such pressure to the brakes of the powered vehicle may be totally lost with a consequent loss of all brakes for the powered vehicle. Accordingly, the trailer is normally equipped with an emergency relay valve which operates automatically to supply air pressure from the auxiliary storage tank to the trailer brakes when operating pressure for the brakes of the powered vehicle has been lost. When the trailer has been so equipped, the brakes are automatically set on the trailer. However, should the powered vehicle and trailer be required to stop quickly or stop on a steep grade, the brakes of the trailer alone may not be sufficient to effect such a stop. Moreover, if the towing connection between the powered vehicle and the trailer should be broken when the trailer brakes are set, the powered vehicle is without any means of stopping it.

Braking systems have been developed wherein a safety valve mechanism is included in the system to prevent the loss of operating pressure from the entire system should

2 a rupture occur in one of the lines leading to a single braking cylinder. In such systems, while the braking effectiveness for one of the wheels may be lost, it is retained for all of the other wheels. This type of system creates another form of hazard in that the loss of braking effectiveness for one wheel creates an unbalanced condition wherein the brake for the oppositely disposed wheel remains operative. Such an unbalanced braking condition can cause the powered vehicle and/or trailer to overturn or at the very least to swerve badly upon a sudden application of the brakes.

One of the objects of this invention is to provide an improved braking system operable upon the loss of operating pressure to the brake for either one of the front pair or rear pair of wheels of the powered vehicle so as to render the brake for the other one of the pair of wheels ineffective also, while preventing the loss of operating pressure in the braking system to the brakes for the other pair of wheels.

It is another object of this invention to provide in a braking system, an improved safety valve having independent piston elements adapted to shut off the flow of operating pressure to respective pairs of brakes, such as the brakes for the front wheels or those for the rear wheels of a powered vehicle. Upon the loss of operating pressure to one of the brakes for either the front or rear pair of wheels by mechanical failure or otherwise, the corresponding piston is operable to shut off the flow of operating pressure to this brake and the other brake for the respective pair of wheels while the safety valve continues to permit the flow of operating pressure to the brakes for the remaining pair of wheels.

Some of the objects of the invention having been stated, other objects will appear as the description proceeds when taken in connection with the accompanying drawings, in which—

Figure 2 is a perspective view of the safety valve device employed in the braking system shown in Figure 1;

Figure 3 is a horizontal sectional view of the safety valve device taken along line 3—3 in Figure 2, and showing the location of the pistons therein when adequate operating pressure is present for each of the brakes associated therewith; and Figure 4 is a vertical sectional view of the safety valve device taken along line 4—4 in Figure 2.

Figure 1:
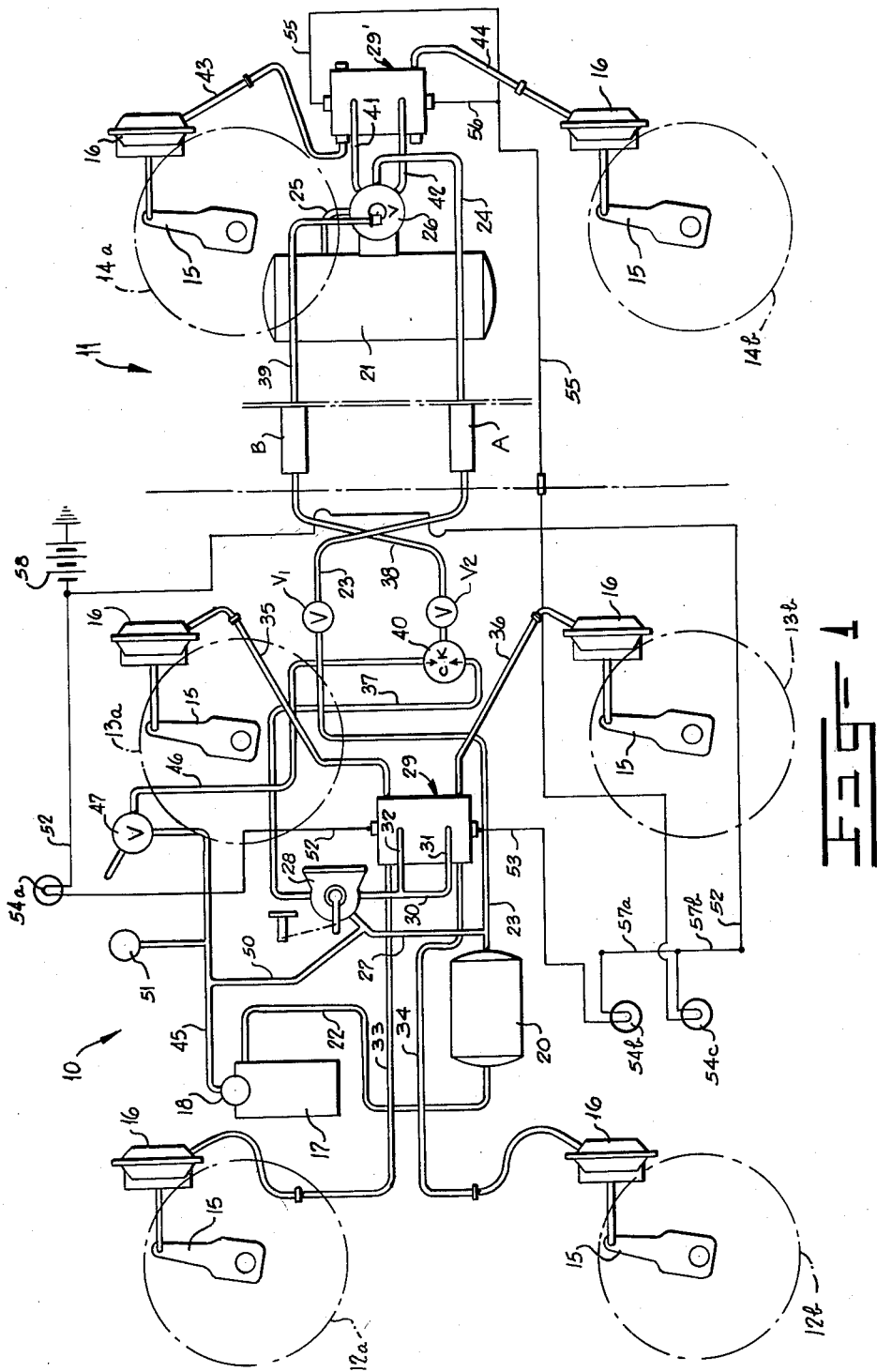
Figure 1 is a diagrammatic view of the fluid pressure braking system for use with a truck, tractor or other powered vehicle having a trailer attached thereto and showing the improved safety valve associated therewith.

Referring more specifically to the drawings, Figure 1 shows diagrammatically the improved compressed air braking system embodying the present invention, as applied to a truck and a trailer towed by the truck. It will be understood that the term "truck" as used herein is intended to include any powered vehicle adapted to tow or pull another vehicle herein referred to as the "trailer." The portion of the braking system utilized by the truck brakes is indicated broadly by the reference numeral 10, while that utilized by the trailer brakes is indicated broadly by the reference numeral 11. The truck is provided with a front pair of ground engaging wheels 12a, 12b and a rear pair of ground engaging wheels 13a, 13b; the trailer has a single pair of ground engaging wheels 14a, 14b. Each wheel is provided with the usual brake 15 which is applied by a fluid pressure actuated brake cylinder 16. Operating pressure is supplied to each brake cylinder 16 by means that will be hereinafter described.

A compressor 17 on the truck having a governor 18 associated therewith is used to compress air for supplying the same directly to a primary storage tank or air reservoir 20 carried on the truck and also indirectly to an auxiliary storage tank or air reservoir 21 mounted on the trailer. When some of the compressed air from the primary air reservoir 20 is exhausted upon application of the brakes 15 for the truck wheels 12a, 12b and 13a, 13b or upon furnishing compressed air to the auxiliary tank 21, the compressor 17 replenishes the supply of compressed air in the reservoir 20 by directing additional compressed air through supply line or conduit 22 extending therebetween. When compressed air from the auxiliary storage tank 21 is used in the application of the brakes 15 for the trailer wheels 14a, 14b, the air in auxiliary tank 21 is replenished from the primary storage tank 20. This is accomplished by directing compressed air from the storage tank 20 to the auxiliary tank 21 through a fluid supply line comprising conduits 23, 24, and 25. Conduit 23 is connected to the storage tank 20 at one end. The other end of the conduit 23 is coupled to one end of the conduit 24 by a suitable hose coupling A. The other end of conduit 24 operatively communicates with one end of conduit 25 through an emergency relay valve 26, and the other end of the conduit 25 communicates with the auxiliary tank 21.

On the truck, compressed air flows from the primary air reservoir 20 into a supply line or conduit 27 which is joined at one end to the conduit 23 at a point adjacent to the primary air reservoir 20 and at its other end to a foot-operated valve 28. The foot-operated valve 28 communicates with a novel safety valve mechanism 29 through supply line or conduit 30 connected thereto and having suitable branch lines 31 and 32 connected to the safety valve 29. The supply lines 27, 30 comprise segments of a main supply conduit. The operation of the safety valve 29 will be described hereinafter in detail.

Upon the foot-operated valve 28 being depressed to open position, air pressure is transmitted individually from the safety valve 29 to the brake cylinders 16 for the front pair of wheels 12a, 12b through branch supply conduits 33 and 34, respectively. Similarly, air pressure is transmitted through the safety valve 29 to the brake cylinders 16 for the rear pair of wheels 13a, 13b through branch supply conduits 35 and 36. At the same time, the opening of the foot-operated valve 28 permits air pressure to flow to the brake cylinders 16 for the trailer wheels 14a, 14b from auxiliary tank 21. This is accomplished by passing some of the compressed air directed through the open valve 28 into and through a service line comprising conduits 37, 38 and 39. Conduit 37 is connected to the foot-operated valve 28 at one end. The other end of conduit 37 operatively communicates with one end of conduit 38 through a two-way check valve 40. The other end of conduit 38 is coupled to one end of conduit 39 by a suitable hose coupling B. The other end of conduit 39 is connected to the emergency relay valve 26. By depressing the foot-operated valve 28 to open the same, air pressure is directed to the emergency relay valve 26 which causes the valve 26 to open, thus permitting the flow of compressed air from the auxiliary tank 21 through the open valve 26. Conduits 41 and 42 extend between the emergency relay valve 26 and a safety valve mechanism 29' which is identical to the safety valve 29 for the truck portion 10 of the braking system. The air pressure flows through the conduits 41 and 42 to the safety valve 29' from where it is transmitted to the brake cylinders 16 for the trailer wheels 14a, 14b through conduits 43 and 44, respectively.

The compressor 17 has another pressure line or conduit 45 connected thereto at one end. The other end of conduit 45 operatively communicates with one end of a conduit 46 through a manually controlled valve 47. The other end of conduit 46 operatively communicates with one end of the conduit 38 through the two-way check valve 40. A branch supply line or conduit 50 extends between the conduit 45 and the branch supply line 27 to provide communication therebetween. An air pressure gauge 51 is preferably provided in the conduit 45 for visibly indicating the amount of air pressure in the supply lines or conduits of the truck portion 10 of the braking system.

The manually controlled valve 47 serves as a means to give the driver control over the trailer brakes 15 independent of the truck brakes 15. In this connection, assuming the manually controlled valve 47 has been moved to open position, compressed air is permitted to flow from conduit 45 into conduit 46, through the two-way check valve 40 and conduits 38 and 39 to the emergency relay valve 26. The presence of this compressed air in the emergency valve 26 causes it to open, thus permitting the flow of compressed air from the auxiliary tank 21 to the brake cylinders 16 for the trailer wheels 14a, 14b in the same manner as described in connection with the operation of the foot-operated valve 28.

It is therefore apparent that the foot-operated valve 28 controls the operation of the brakes 15 for both the truck portion 10 and the trailer portion 11 of the braking system, while the manually operable valve 47 independently controls the operation of the brakes 15 for the trailer portion 11 only.

It will be noted that the safety valve mechanism 29 for the truck portion 10 of the braking system has wires or electric conductors 52, 53 leading away from opposite ends thereof through suitable indicator means, such as electric bulbs 54a and 54b. Similarly, the safety valve 29' for the trailer portion 11 of the braking system has wires or electric conductors 55, 56 leading away from opposite ends thereof. In the latter instance, the other end of wire 56 is joined to the wire 55 at an intermediate point thereon adjacent to the safety valve 29'. The wire 55 extends through an electric bulb 54c. The wires 52, 53, and 55 are connected together at their other ends by branch wires or electric conductors 57a and 57b, wire 57a extending between the other ends of wires 53 and 55 and wire 57b extending between the other ends of wires 55 and 52, respectively. A source of power, such as an electric storage battery 58, is operatively connected to the wiring circuit, being shown as connected to the wire 52 at a point between the electric bulb 54a and the other end of the wire 52. The battery 58 and the terminals of the two safety valves 29, 29' are suitably grounded. In the case of the terminals of the two safety valves 29, 29', however, normally open switch mechanisms to be subsequently described must be closed to effect connections with the grounds in order to complete the electrical circuits through the electric bulbs 54a, 54b, and 54c, respectively, to light the same.

Thus it will be apparent that the electric bulbs 54a, 54b, and 54c are wired independently of each other. Should one of the pressure lines or conduits in the truck braking system 10 or the trailer braking system 11 become ruptured or otherwise damaged, the loss of pressure therefrom will be communicated to the safety valve mechanism 29 or 29' in a manner to be subsequently described thereby closing the corresponding switch mechanism between the terminal and ground of the safety valve 29 or 29' and completing the electrical circuit through one of the bulbs 54a, 54b, 54c so as to light the bulb. The bulbs 54a, 54b, and 54c are appropriately marked to designate portions of the braking system relating to the front pair of truck wheels 12a, 12b, the rear pair of truck wheels 13a, 13b, and the trailer wheels 14a, 14b, respectively. When one of the bulbs 54a, 54b, and 54c is lit, this warns the driver that the particular portion of the braking system designated by the lit bulb is impaired because of a loss of operating pressure therefrom.

The safety valve mechanisms 29 and 29' are identical as previously indicated. To prevent repetitious description, therefore, only the valve 29 will be described in detail, it being understood that valve 29' is constructed in a like manner. The safety valve 29 is illustrated in Figures 2–4, inclusive. Referring to Figures 2–4, inclusive, the safety valve 29 comprises a housing 60 having a top wall 61, a bottom wall 62, side walls 63 and 64, and end walls 65 and 66. In each of its end walls 65 and 66, the housing 60 is provided with longitudinal bores 67 and 68, respectively. It will be observed that the proximal inner ends of the longitudinal bores 67 and 68 are closed, being spaced apart by a wall 70. The wall 70 is suitably apertured to slidably receive a piston rod 71, the opposite ends of which extend into the respective bores 67 and 68. The longitudinal bores 67, 68 constitute two sections of a valve chamber, the bores 67, 68 being interconnected through the aperture in wall 70. The piston rod 71 carries pistons 72 and 73 on its opposite ends, piston 72 being adapted to be reciprocated in the longitudinal bore 67 while the piston 73 is likewise adapted to be reciprocated in the longitudinal bore 68. Since the pistons 72, 73 are fixedly secured to opposite ends of the piston rod 71, there is no relative movement between them. The piston rod 71 and pistons 72, 73 constitute a pressure responsive valve member. Coil springs 74 surround the piston rod 71 on each side of the wall 70. Each coil spring 74 is seated at one end thereof against the corresponding side of the wall 70, while the other end thereof is seated against the respective one of the pistons 72 and 73.

The outer ends of the longitudinal bores 67 and 68 are closed by respective switch means 75, 75'. Since the switch means 75, 75' for each of the longitudinal bores 67, 68 are identical, a description of one of these switches will suffice. In this connection, the switch means 75 for the longitudinal bore 67 comprises a thimble member 76 which includes a cylindrical sleeve portion 77 adapted to be snugly received within the outer end of the bore 67 in a press-fit engagement with the wall defining the bore. A closure plate 80 having an outer diameter greater than that of the cylindrical sleeve portion 77 is formed integral therewith. The plate 80 is disposed in abutment with the end wall 65 of the housing 60. Suitable means, such as screws 81 extend through the plate 80 into the end wall 65 to secure the thimble member 76 in place. A centrally disposed threaded opening 82 is provided in the plate 80 for reception of a threaded nipple 83. The threaded nipple 83 carries therewithin an elongated pin 84 of electrically conductive material, the inner end of which protrudes within the longitudinal bore 67 formed in the housing 60. A sleeve 85 of insulating material, such as rubber, is disposed between the nipple 83 and the pin 84, being snugly received by the nipple 83 while permitting the pin 84 to slide therewithin. A screw 86 of electrically conductive material protrudes outwardly from the outer end of the nipple 83, being adapted to receive the wire or electric conductor 53. The wire 53 is sandwiched between a pair of washers 87 and is held in place on the screw 86 by a nut 88 which is threaded about the screw 86 into abutment with the outermost washer 87 to clamp the wire 53 between the washers 87.

The screw 86 is secured in place within the outer end of the nipple 83 by means of a surrounding thimble 90 of insulating material, such as rubber, which is snugly secured within the outer end of the nipple 83. The outer end of the nipple 83 may be threaded for reception of a cap member 91 which serves to retain the insulating thimble 90 in place. The pin 84 and the screw 86 which protrude from opposite ends of the nipple 83 are spaced from each other, the pin 84 being resiliently mounted with respect to the screw 86 by means of a coil spring 92 interposed therebetween. The coil spring 92 is also of electrically conductive material.

The inner end of the sleeve portion 77 may serve as a valve seat for the piston 72. However, in order to provide a better valve seal and to prevent undue noise when the piston 72 is moved against the valve seat, a resilient annular washer or gasket 93 is positioned in abutment with the inner end of the sleeve portion 77 for engagement by the piston 72. It will be observed that the inner end of the pin 84 protrudes inwardly beyond the resilient gasket 93 for a purpose which will be more fully apparent hereinafter.

As heretofore explained, the switch means 75' which is installed in the outer end of the longitudinal bore 68 is identical with the switch means 75 and cooperates with the piston 73 in the same manner that the switch 75 cooperates with piston 72. Therefore, the elements of switch 75' shall bear the same reference characters as like elements of switch 75 with the prime notation added.

The top wall 61 of the housing 60 is provided with a pair of spaced threaded apertures 94, 95 therein which communicate with the longitudinal bores 67, 68 respectively. The threaded apertures 94 and 95 are adapted to receive threaded nozzles 96 and 97, respectively, to which are coupled the branch lines 31 and 32 directing air pressure to the safety valve 29.

As will be observed in Figures 2 and 3, the side walls 63 and 64 of the housing 60 are provided with respective pairs of spaced apart threaded apertures 100a, 100b and 101a, 101b. The threaded apertures 100a and 100b are adapted to receive threaded nozzles 102a and 102b, respectively, to which are coupled the pressure lines or conduits 33 and 34 for directing operating pressure to the brake cylinders 16 of the front pair of truck wheels 12a, 12b. Similarly, the threaded apertures 101a and 101b are adapted to receive threaded nozzles 103a and 103b, respectively, to which are coupled the pressure lines or conduits 35 and 36 for directing operating pressure to the brake cylinders 16 of the rear pair of truck wheels 13a, 13b.

It will be noted in Figure 3 that a transverse passageway 104 extends from the threaded aperture 100a in the side wall 63 of the housing 60 into communication with the longitudinal bore 68. The sleeve portion 77' of the thimble member 76' is provided with a suitable port or opening 105 therein in alinement with the transverse passageway 104 to permit communication between the longitudinal bore 68 and the transverse passageway 104 which leads to the conduit 33. A longitudinal passage 106 connects the transverse passageway 104 with the threaded aperture 100b in the side wall 63, thereby providing communication between the conduit 34 and the longitudinal bore 68.

In a similar manner, a transverse passageway 107 extends from the threaded aperture 101b in the side wall 64 into communication with the longitudinal bore 67, such communication being permitted by a suitable port or opening 110 formed in the sleeve portion 77 of the thimble member 76 and in alinement with the transverse passageway 107 which leads to the conduit 36. A longitudinal passage 111 connects the transverse passageway 107 with the threaded aperture 101a in the side wall 64, thereby providing communication between the conduit 35 and the longitudinal bore 67.

The operation of the safety valve mechanisms 29, 29' in the braking system will now be described. In this connection, in order to point out the advantageous features of this invention, certain mechanical failures in the conduits supplying operating pressure to the brake cylinders 16 for the truck and trailer brakes 15 will be assumed. The main air reservoir 20 and the auxiliary storage tank 21 of the braking system are normally designed to contain an operating pressure of 120 pounds per square inch. Let us assume, first, that a break has occurred somewhere in conduit 24 which comprises a portion of the supply conduit 23, 24 between the main air reservoir 20 for the truck brakes and the auxiliary storage tank 21 for the trailer brakes. This would result in a loss of pressure to the atmosphere, thus relieving the pressure on the emergency relay valve 26. When this condition occurs, the relay valve 26 operates automatically to shut off pressure leakage from the auxiliary tank 21 through the conduit 24 while admitting air from the auxiliary storage tank 21 to the brake cylinders 16 of the trailer wheels 14a, 14b through the safety valve 29' in the manner previously described to lock the trailer wheels 14a, 14b.

The assumed break or rupture in the conduit 24 also causes a drop in the air pressure maintained in the main storage tank or reservoir 20. For a time, the air pressure emanating from the main reservoir 20 will be sufficient to sustain the braking effectiveness on the front wheels 12a, 12b and rear wheels 13a, 13b of the truck. However, it is preferable to provide a valve $V_1$ in the conduit 23 to prevent the entire loss of operating pressure from the main storage tank 20 for maintaining the effectiveness of the brakes 15 for the truck wheels 12a, 12b and 13a, 13b in the event that the break has occurred in conduit 24 or that the hose coupling A has become disengaged from either conduit 23 or 24. When the pressure in the conduit 23 has been lowered below a predetermined amount, as for example 60 pounds per square inch, the valve $V_1$ is designed to automatically close thus preventing the further loss of operating pressure from the truck portion 10 of the braking system and allowing the driver to apply the brakes 15 to the truck wheels 12a, 12b and 13a, 13b by depressing the foot-operated valve 28.

A second situation occurs when one of the pressure conduits leading to the emergency relay valve 26, which controls the operation of the trailer brakes 15, sustains a break therein. The conduits here involved would include those designated at 37, 38 and 39 which provide for control of the trailer brakes 15 through the foot-operated valve 28 and conduits 50, 45, 46 which together with conduits 38 and 39 provide for control of the trailer brakes 15 through the manually-operated valve 47. Assuming the break has occurred in conduit 39, once again operating pressure from the truck portion 10 of the braking system will be lost to the atmosphere. A valve $V_2$ is accordingly provided in the conduit 38 to prevent the entire loss of operating pressure from the main storage tank 20 for maintaining the effectiveness of the brakes 15 for the truck wheels 12a, 12b and 13a, 13b in the event that the break has occurred in conduit 39 or that the hose coupling B has become disengaged from either conduit 38 or 39. When the pressure in the conduit 38 has been lowered below a predetermined amount, as for example 60 pounds per square inch, the valve $V_2$ is designed to automatically close thus preventing the further loss of operating pressure from the truck portion 10 of the braking system.

Thus, valves $V_1$ and $V_2$ provide additional safeguards for the truck portion 10 of the braking system in the event that either of the pressure conduits 24 and 39 in the trailer portion 11 become ruptured or the hose couplings A and B release the conduits which they connect. The emergency relay valve 26 automatically opens in the event of either occurrence mentioned above and also when the operating pressure in the truck portion 10 of the braking system drops below a predetermined amount (60 pounds per square inch) to permit compressed air from the auxiliary storage tank 21 to flow therethrough for actuating the trailer brakes 15 and locking the trailer wheels 14a, 14b.

Another situation occurs when one of the pressure conduits leading to the brake cylinder 16 for one of the truck wheels becomes ruptured. By way of an example, let us assume that pressure conduit 33 leading to the brake cylinder 16 of the front wheel 12a of the truck has become ruptured. Upon the depression of the foot-operated valve 28, the operating pressure in conduit 33 is lost through the ruptured portion thereof, and this lowered pressure condition is communicated to the longitudinal bore 68 in the housing 69 of the safety valve 29. Ordinarily, the operating pressure for the brakes 15 of the front wheels 12a, 12b which is present on the forward end of the piston 73 is sufficient to maintain the piston 73 in spaced relationship with respect to the resilient gasket 93' forming the valve seat therefor. When this spaced relationship between the piston 73 and its valve seat 93' exists, compressed air from the branch supply line 32 is permitted to flow through the safety valve 29 to the conduits 33 and 34 by passing through the longitudinal bore 68 and the transverse passageway 104. Some of the compressed air enters conduit 33 from the transverse passageway 104 while some of the compressed air is diverted from the transverse passageway 104 into the longitudinal passage 106 from where it is directed into conduit 34.

This spaced relationship between the piston 73 and its valve seat 93' is normally maintained by balanced forces acting against the forward ends or distal faces of the pistons 72 and 73. The force acting against the forward end of the piston 73 is the aforesaid operating pressure for the brakes 15 of the front truck wheels 12a, 12b, while the counter-balancing force acting against the forward end of the piston 72 is provided by the operating pressure for the brakes 15 of the rear truck wheels 13a, 13b which enters the bore 67 through the branch supply line 31 on the forward end of piston 72.

Once the pressure equilibrium existing between the pistons 72, 73 has been destroyed, as in this instance by the lowered pressure condition in the bore 68, the piston 73 is forced against the valve seat 93' due to the action of the operating pressure against the forward end of piston 72. When the piston 73 is seated against the resilient valve seat 93', the transverse passageway 104 is shut off from the branch supply line 32 communicating with the longitudinal bore 68. Likewise, the longitudinal passage 106 no longer communicates with the branch supply line 32.

Thus, it can be seen that further loss of operating pressure through the rupture in the pressure conduit 33 is prevented by the action of the piston 73 in closing the opening through the valve seat 93'. Not only is the air pressure shut off from the pressure conduit 33, but it is also prevented from entering into the pressure conduit 34. It is thus apparent that a rupture in either of the pressure conduits 33 and 34 will cause the piston 73 to shut off communication between the pressure supply line 32 and both of these pressure conduits 33 and 34. Should either of the front truck wheels 12a, 12b lose its braking effectiveness through a loss of operating pressure to the corresponding brake cylinder 16, the other front wheel will also lose its brakes at the same time, thereby preventing an unbalanced brake condition for the truck wheels which could cause the truck to swerve badly or even overturn.

The operation of the safety valve 29 is similar when one of the pressure conduits 35 and 36 ruptures. In this case, the lowered pressure condition created by the rupture of either of these conduits 35 or 36 will be communicated to the longitudinal bore 67 thus destroying the pressure equilibrium between the pistons 72, 73. The unbalanced pressure condition now present results in the movement of piston 72 into engagement with the resilient valve seat 93 to shut off communication between the pressure supply line 31 and the pressure conduits 35 and 36. In this way, even though the brakes 15 for either the front pair of truck wheels 12a, 12b or the rear pair of truck wheels 13a, 13b are lost, the brakes for the other pair of wheels will remain effective because the operating pressure therefor will be prevented from dissipation through the defective portion of the braking system.

It will be noted that the safety valve 29' located in the trailer portion 11 of the braking system although identical in structure to the safety valve 29 in the truck portion 10 has only two pressure supplying conduits 43 and 44 leading away therefrom, since only two wheels 14a, 14b are shown for the trailer portion 11. In the case of the two wheel trailer shown, the pressure supplying conduits 43 and 44 are arranged on opposite sides of the safety valve 29' to permit the conduits to transmit operating pressure independently of each other. It will be noted that the apertures in the side walls of the safety valve 29' corresponding to those shown in Figure 3 at 100b and 101a are plugged, since these are not in use. Thus, in the case of a two-wheeled trailer, should a rupture occur in one of the pressure conduits 43, 44, that conduit will be sealed off from the remainder of the system through the movement of a corresponding piston in the safety valve 29' to prevent the further loss of operating pressure therethrough while the other conduit will continue to pass air pressure to the brake cylinder 16 of the respective trailer wheel 14a or 14b. Accordingly, even though braking effectiveness may be lost for one of the trailer wheels 14a, 14b, the brake 15 will remain effective for the other of the trailer wheels.

Although a two-wheel trailer braking system 11 has been illustrated and described, it is contemplated that this braking system could be adapted to be used with a four-wheel trailer by removing the plugs in the safety valve 29' and installing pressure conduits in the unplugged apertures which lead to two of the trailer wheels. Where a four-wheel trailer braking system is employed, the pressure conduits supplying operating pressure to the brakes for the front and rear pairs of trailer wheels will be connected to the apertures formed in opposite side walls of the safety valve 29' in the same manner illustrated and described with respect to the truck wheels and safety valve 29. A four-wheel trailer braking system, therefore, would prevent the loss of operating pressure from the brakes for one of the pairs of front and rear trailer wheels should a pressure conduit leading to one wheel of the other pair of trailer wheels be ruptured in the same manner described with respect to the four-wheel truck braking system 10.

When a rupture has occurred in any one of the conduits 33, 34, 35, 36, 43, or 44 which supply operating pressure to the brake cylinders 16 for the truck and trailer wheels, so as to result in the loss of braking effectiveness on the wheel served by the ruptured conduit, one of the bulbs 54a, 54b, 54c will light to indicate the source of the trouble and warn the driver of the defect in the braking system. In this connection, the forward ends of the pistons 72 and 73 in the safety valve 29 and those of the pistons in safety valve 29' serve as grounds. Assuming a rupture has occurred in conduit 33, the lowered pressure condition created thereby is communicated to the bore 68 in the safety valve 29 and destroys the pressure equilibrium of the pistons 72, 73, whereupon the piston 73 moves into seating engagement with its valve seat 93', as previously explained. It will be apparent that the piston 73 will contact the inner end of the pin 84' upon its movement into engagement with the valve seat 93', thereby completing the electrical circuit through the pin 84', spring 92', and screw 86' to the wire 52 and causing the bulb 54a to light. The electrical circuits through the bulbs 54b and 54c are completed in a similar manner when contact between corresponding pistons and pins occurs.

Thus, it will be seen that my improved braking system and the novel safety valves 29, 29' associated therewith are effective to prevent the loss of operating pressure from the remainder of the system should one of the pressure conduits become damaged or ruptured resulting in a loss of operating pressure in a portion of the braking system. The safety valve 29 associated with the truck portion 10 of the braking system is effective to shut off operating pressure for the brakes 15 of both of the front pair of wheels 12a, 12b should a break or rupture occur in either of the pressure conduits 33 and 34 leading to these wheels, respectively, while the operating pressure for the brakes 15 of the rear pair of wheels 13a, 13b remains unaffected and vice versa. The presence of an unbalanced braking condition for the truck wheels with its resulting hazards is accordingly precluded by my improved braking system.

In the drawings and specification, there has been set forth a preferred embodiment of the invention and, although specific terms are employed, they are used in a generic and descriptive sense only, and not for purposes of limitation, the scope of the invention being defined in the claims.

I claim:

1. A safety valve for fluid pressure braking systems comprising a housing having a longitudinally extending valve chamber therein; valve closure means slidably mounted in said chamber, said valve closure means comprising a piston rod, piston members fixed on the opposite ends of said rod, a pair of resilient springs encircling said rod, and means in said valve chamber intermediate said piston members against which the proximal ends of said springs abut, the distal ends of said springs abutting against said piston members respectively; said housing being provided with a pair of spaced inlet openings, each of said inlets communicating with said valve chamber at positions beyond the respective outer ends of said piston members carried therein in normal operation, said housing also being provided with first and second pairs of outlet openings for receiving the brake lines for the front and rear pairs of wheels of a vehicle respectively, means defining first and second passages in said housing communicating with the opposite ends of said valve chamber, said first passage interconnecting said first pair of outlets and said second passage interconnecting said second pair of outlets, whereby said piston members are exposed to the pressure in the corresponding passage and the pair of outlets interconnected thereby, valve seats at the opposite ends of said valve chamber, said valve seats being spaced from the corresponding piston member of said valve closure means in normal operation, and said valve closure means being movable toward an end of said valve chamber in response to a lowered pressure condition at that end for engaging the corresponding one of said piston members with said valve seat at that end of said valve chamber in sealing relationship to shut off communication between the respective one of said first and second passages and said valve chamber, whereby the pair of outlets interconnected by said one passage are blocked from the corresponding inlet associated with said valve chamber.

2. A safety valve for fluid pressure braking systems comprising a housing having a pair of axially alined longitudinal bores therein, said bores being spaced apart by a wall having an aperture therein; valve closure means comprising a piston rod extending through the aperture in said wall into each of said bores, piston members fixed on the opposite ends of said rod and slidably mounted in the respective bores, a pair of resilient springs encircling said rod, and said springs respectively abutting against opposite sides of said wall and against said piston members; said housing being provided with a pair of spaced inlet openings, each of said inlets communicating with a corresponding bore at a position beyond the end of said piston member carried therein in normal operation, said housing also being provided with first and second pairs of outlet openings for receiving the brake lines for the front and rear pairs of wheels of a vehicle respectively, means defining first and second passages in said housing communicating with the outer ends of said bores remote from said wall, said first passage interconnecting said first pair of outlets and said second passage interconnecting said second pair of outlets, whereby said piston members are exposed to the pressure in the corresponding passage and the pair of outlets interconnected thereby, valve seats at the outer ends of said bores, said valve seats being spaced from the corresponding piston member of said valve closure means in normal operation, and said valve closure means being movable toward an outer end of one of said pair of bores in response to a lowered pressure condition in said one bore for engaging the corresponding one of said piston members with said valve seat at the outer end of said one bore in sealing relationship, and said one piston member closing the inlet communicating with said one bore when in engagement with said valve seat, whereby communication between the respective one of said first and second passages and the pair of outlets interconnected thereby with said one bore and the inlet associated therewith is blocked.

References Cited in the file of this patent

UNITED STATES PATENTS

| | | |
|---|---|---|
| 2,046,316 | Bentz | July 7, 1936 |
| 2,195,214 | Jacob | Mar. 26, 1940 |
| 2,206,656 | Boldt | July 2, 1940 |
| 2,411,406 | Affleck | Nov. 19, 1946 |
| 2,461,712 | Allin et al. | Feb. 15, 1949 |
| 2,568,311 | Wise et al. | Sept. 18, 1951 |
| 2,824,627 | Winter | Feb. 25, 1958 |
| 2,854,016 | Margida | Sept. 30, 1958 |
| 2,879,791 | Hollman | Mar. 31, 1959 |